MOWRY & DEPPEN.
Corn-Planter.
No. 30,885. Patented Dec. 11, 1860.
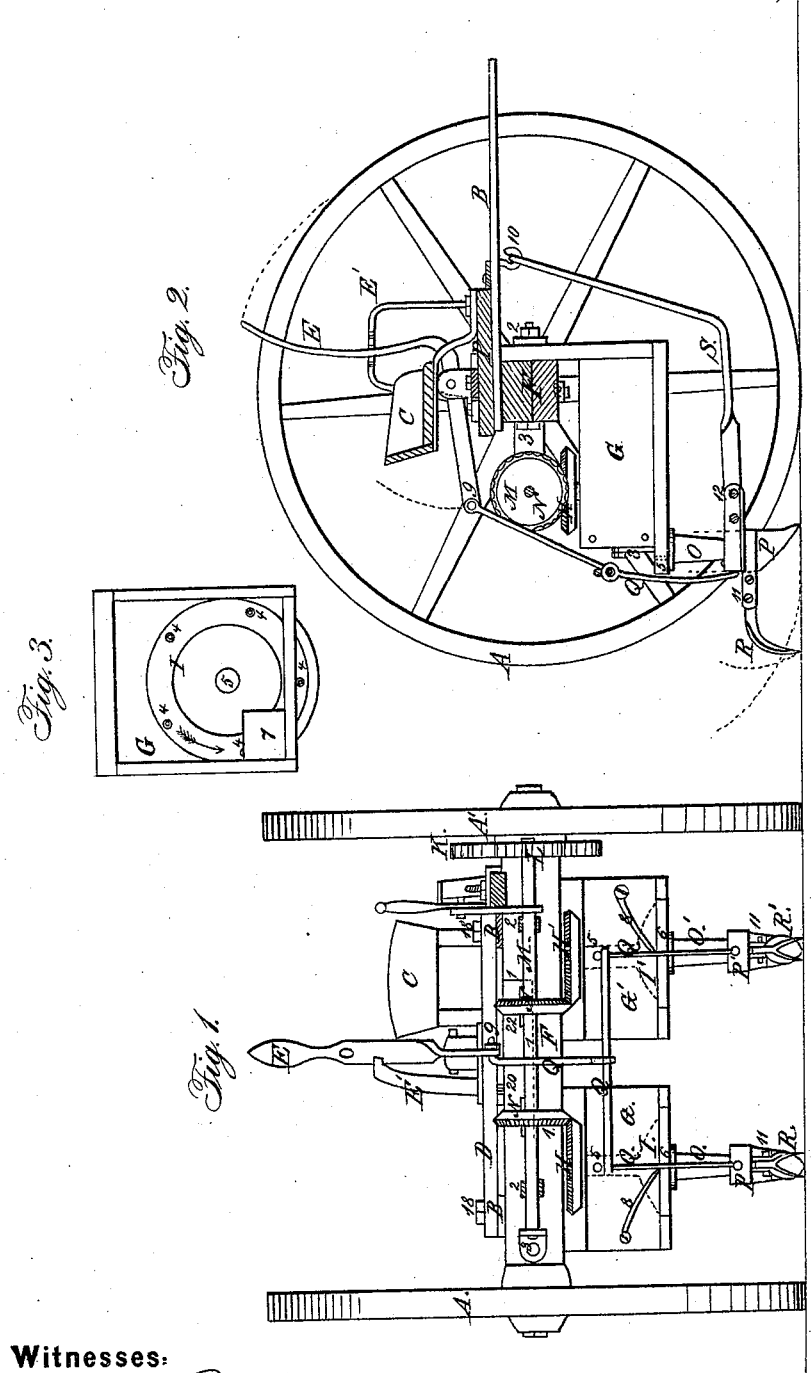
Witnesses:
Ezra Reed
William Zeller
Inventor:
S. Mowry
E. Deppen

UNITED STATES PATENT OFFICE.

SAMUEL MOWRY AND ELI DEPPEN, OF WOMELSDORF, PENNSYLVANIA.

IMPROVEMENT IN CORN-PLANTERS.

Specification forming part of Letters Patent No. 30,885, dated December 11, 1860.

*To all whom it may concern:*

Be it known that we, SAMUEL MOWRY and ELI DEPPEN, both of Womelsdorf, in the county of Berks and State of Pennsylvania, have invented a new and Improved Convertible Corn-Planter; and we do hereby declare that the following is a full, clear, and exact description of the construction and operation of the same, reference being had to the annexed drawings, making a part of this specification, in which—

Figure 1 represents a rear end view of the apparatus as arranged for planting corn, and Fig. 2 a vertical longitudinal section of the same; Fig. 3, a plan view of the grain holding and dropping boxes, like letters, when on the different figures, indicating the same parts.

The nature of our invention consists in a peculiar combination and arrangement together of certain devices, as hereinafter described, whereby the space between the carrying-wheels and that between the grain-dropping boxes, respectively, as well as the spaces between the said wheels and dropping-boxes collectively, are rendered convertible or changeable, so as to enable the operator to more readily convert or adapt the same machine for properly dropping any of the various kinds of grains, &c., required in agriculture; and also in the combined arrangement, with the said axle and dropping-boxes, of the dropping-disks, tubes, and operating-wheels, as hereinafter described, whereby the dropping of the grain, &c., is effected in a more certain and accurate manner than heretofore; and, also, in the arrangement of devices, as hereinafter described, for operating and protecting in a more certain manner the furrowing-tubes and covering-hooks.

In the said drawings, A and A' represent the carrying-wheels; B, the thill; C, the driver's seat; D, the platform for supporting the same; E, the hand-lever for operating or controlling both the furrowing-tubes and covering-hooks, and E' its stay. F represents the axle of the planter; G and G', its corn-holding boxes; H H', the bevel-pinions of its dropping-disks I I therein; K, its main or driving spur-wheel, which gives motion, through the pinion L, to its shaft M; N N', two bevel-pinions on shaft M, which are in gear with the respective disk-pinions H H'; O O', its corn-conducting tubes, and P P' their respectively-surrounding furrowing-tubes, and Q its bridle, which connects the said furrowing-tubes to the hand-lever E, whereby they can be raised or lowered, as occasion may require. R and R' represent its covering-hooks, which are attached, respectively, to the tubes P P', and S one of its two tie-rods, which secure the tubes P P' to the thill B, and allow of the said tubes and hooks being raised or lowered by the driver in his operating the lever E, as occasion may require.

The seat C, lever E, stay E', and thill B are all secured together permanently upon the platform D, and the latter detachably to the axle F by means of removable screw-bolts 18 18.

The axle F is in two pieces, spliced and bolted together, as shown by the joint-lines 1 1 1, and is therefore well adapted in being easily adjusted and in a simple manner to vary the space between the wheels A A' as occasion may require.

The corn-boxes G G' are secured to the axle F by means of the screw-bolts 2 2, so as to allow of their being adjusted thereto at different distances apart, and the shaft-bearing 3, as also the bevel-wheels N N', are made adjustable for the same purpose.

The dropping-disks I I' have each five grain-holes, 4 4, made through them at equidistant points near their peripheries, and are attached to their respective shafts 5 5 (dotted lines) and pinions H H', so as to be rotated horizontally in recesses made to receive them in the bottoms of their respective boxes G G', the said bottoms each having a corresponding hole, 6, made through its rear projecting edge, which allows the three or four grains (more or less) which are carried in each of the holes of its rotating disk I or I' to fall through it into the tube O or O', as the case may be, the said disk-holes 4 4 being previously passed under their respective clearing-blocks 7 in succession, which prevent more grains of corn from being carried to their respective tubes O or O' than are contained in the said disk-holes. The end of a small spring-forcer, 8, which is applied to each box G G', strikes into the holes 4 4 as the latter are respectively and successively brought over the outlet-holes 6 6, and thus insures the descent of the grains into their respective tubes O O', from whence the said grains drop into the furrows as made by the lower ends of the tubes P P'. Attached to each of these furrowing-tubes P P' is the covering-hook R or R', which covers the corn so dropped with earth, and for the purpose of raising up these tubes P P' and hooks R R', so as to clear a rock, stump, or other fixed obstruction on the ground, the bridle Q is provided, which is connected with the hand-lever E, as before stated, by a bend and a burr or nut, 9, so that it can readily be either attached or detached, and so, also, that when the driver presses down the handle of the said bent lever E the tubes P P' and hooks R R' will be raised up to the positions indicated by the dotted lines in Fig. 2. Each tie-rod S of the tubes P P' is secured to the thill B by means of a hook, 10, so that the same can be readily either attached to or detached from the thill B, as occasion may require.

The covering-hooks R R' are each held down in their working position by means of a wooden pin, 11, in each, and the tie-rods S are each held in connection with its respective tube P or P' also by means of a wooden pin, 12, so that should either the tubes or the hooks encounter a fixed stone, stump, or root, &c., the said pins 11 and 12 will break and let the said tubes or hooks drag over them without incurring injury. The supporting-pins 11 of the hooks also allow of the said hooks being adjusted higher or lower as a larger or smaller quantity of dirt is required to be moved by their curved flat prongs to cover the dropped corn. The relative diameters of the carrying-wheels A A' and dropping-disks I I' with those of the gear-wheels connecting the same are such that a very slow motion is given to the grain-carrying holes 4 4, and this insures more regular, certain, and efficient filling of the said holes with grain and the dropping of the same into the tubes below.

It will be perceived that in the operation of the apparatus (conditioned as in Figs. 1 and 2) the speed of the rotary motion of the disks I I' will be governed by the diameters of the carrying-wheel A' and the gear-wheels which connect them therewith, and that the boxes G G', from their position and number, admit of their being each made of a comparatively large size, and consequently the diameters of the disks greater than heretofore, and there being five holes, 4 4, in each disk they need move at only a comparatively slow rate to drop the corn at points in the rows at the usual distance apart, and consequently have ample time to receive and discharge the grains in a more certain and accurate manner than heretofore with the usual gear.

It will also be perceived that as the axle F is adjustable in its length by means of the splice 1 1 and its binding-bolts 20 20, and as the grain-boxes G G' are also made adjustable upon the axle F by means of the bolts 2 2, they may both be readily arranged to form the rows at any required distances apart by keeping one wheel in its previously-made track on the return-trip of the machine, and also the two rows under the machine at any suitable distance from each other, by simply adjusting the axle and boxes accordingly, and also that perfect security against breakage of the furrowing-tubes P P' and of the covering-hooks R R' is afforded by the operating-lever E when in connection therewith, as described, and by the wooden pins 11 and 12, which will break and let the said tubes or hooks pass over such obstructions as would otherwise break them.

Having thus fully described our convertible corn-planter and pointed out its advantages or utility, what we claim as new therein of our invention, and desire to secure by Letters Patent, is confined to the following, viz:

1. The arrangement of the divided axle F, the seed-boxes G G', the disks I I, tubes O O', springs S S', pinions H H' and N N', shaft M, pinion L, spur-wheel K, and wheels A A', the several parts being constructed and connected substantially as and for the purpose herein specified.

2. In combination with the subject of the first claim, the lever E, bridle Q, furrowing-tubes P P', covering-hooks R R', and tie-rods S S, arranged and used as and for the purpose herein specified.

SAMUEL MOWRY. [L. S.]
    ELI DEPPEN. [L. S.]

Witnesses:
 EZRA REED,
 WILLIAM ZELLER.